United States Patent [19]

Mano

[11] Patent Number: 5,121,424
[45] Date of Patent: Jun. 9, 1992

[54] TELEPHONE SYSTEM AND SPEECH LEVEL ADJUSTING METHOD THEREFOR

[75] Inventor: Hiroshi Mano, Hino, Japan

[73] Assignee: Kabushiki Kaisha Toshiba, Kawasaki, Japan

[21] Appl. No.: 669,091

[22] Filed: Mar. 13, 1991

[30] Foreign Application Priority Data

Mar. 16, 1990 [JP] Japan .................. 2-65670

[51] Int. Cl.⁵ .................. H04M 1/60; H04M 1/76
[52] U.S. Cl. .................. 379/165; 379/6; 379/347; 379/398
[58] Field of Search .................. 379/165, 6, 340, 347, 379/377, 394, 398, 400

[56] References Cited

U.S. PATENT DOCUMENTS

4,887,293 12/1989 Molnar .................. 379/165 X
4,980,908 12/1990 Yu .................. 379/347 X Primary Examiner—Stafford D. Schreyer
Attorney, Agent, or Firm—Foley & Lardner

[57] ABSTRACT

In a telephone system 1 connectable to both integrated service digital network (ISDN) lines 3a and 3b and a public subscriber telephone network (PSTN) line 7 and having a plurality of extension telephone sets 11a to 11d, the speech sound volume through the ISDN lines 3a and 3b is so adjusted as to become equal to that through the PSTN line 7, by changing the loss rate (i.e. gain) of digital pads 55 and 47 provided in ISDN interface units 5a and 5b. That is, a level confirmation tone is generated in the system 1; this tone is transmitted to a first extension telephone set 11a via only the ISDN on one hand and to a second extension telephone set 11b via both the ISDN and PSTN in series on the other hand; and the loss rate (i.e. gain) of the digital pads 55 and 47 are changed or adjusted so that the sound of the level confirmation tone can be heard at the same volume level by both the telephone sets 11a and 11b.

2 Claims, 12 Drawing Sheets

FIG. IIA

FIG. 11B

TELEPHONE SYSTEM AND SPEECH LEVEL ADJUSTING METHOD THEREFOR

BACKGROUND OF THE INVENTION

The present invention relates to a telephone system and more specifically to a transmission level regulating method for a telephone system connectable to both analog and digital communication networks.

Figure 1:
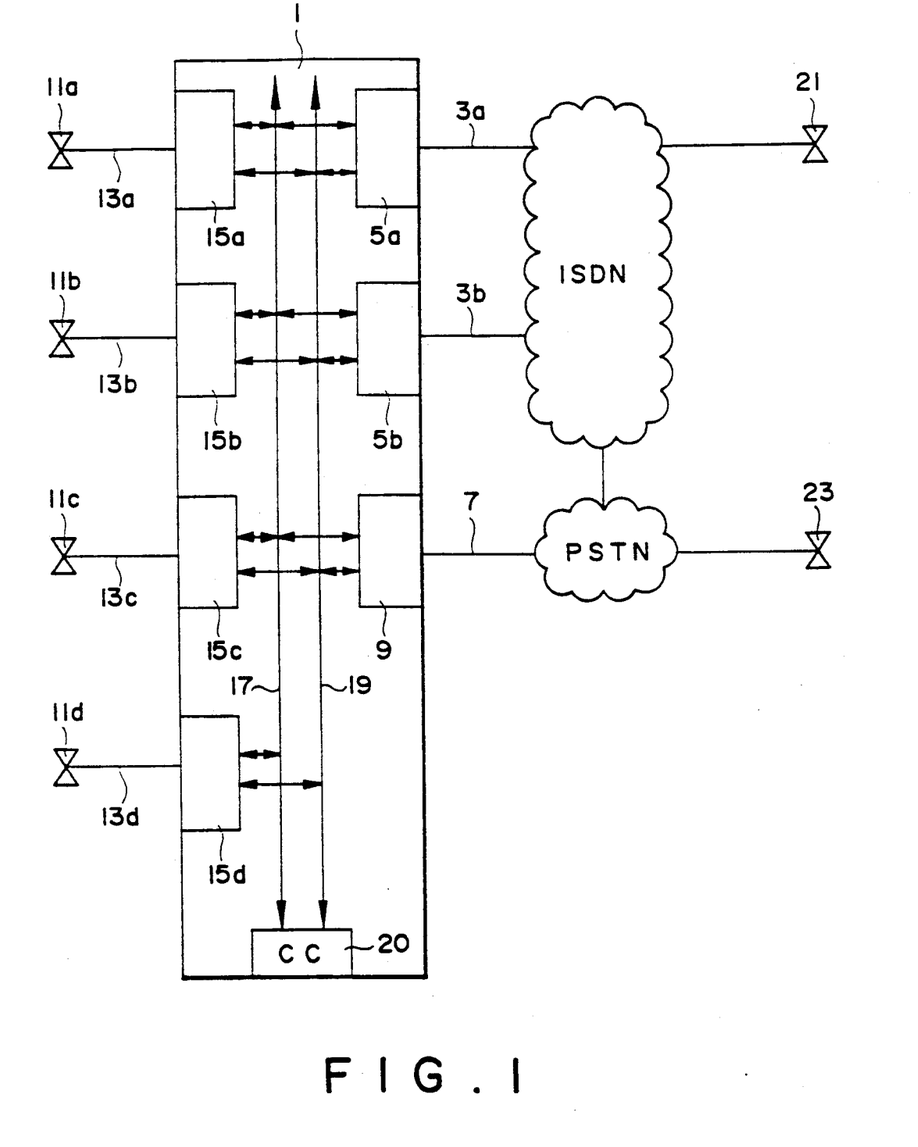
FIG. 1 is a block diagram showing the general system configuration of a key telephone system connectable to both the two networks of ISDN and PSTN.

As an example of telephone system of this type, there exists a key telephone system connectable to both the integrated service digital network (ISDN) and the (analog) public subscriber telephone network (PSTN). FIG. 1 shows a typical system configuration of this telephone system. On a key service unit 1, there are mounted ISDN interface units 5a and 5b connected to ISDN lines 3a and 3b, a PSTN interface unit 9 connected to a PSTN line 7, extension terminal interface units 15a to 15d connected to lines 13a to 13d from extension terminals 11a to 11d, etc. These interface units are connected to a control unit 20 for controlling the entire key service unit and channel switching, via a data highway 17 serving as a time-sharing transmission line for control data and a speech highway 19 serving as a time-sharing transmission line for speech PCM (pulse code modulation) codes.

Here, there exists a loss of 4 dB on an average between a subscriber for the PSTN line 7 and a terminal office. In addition, some loss is inevitably produced in a 2-4 line switching circuit and a CODEC (coder/decoder) of an office line (PSTN) interface unit 9. Further, in general the key service unit 1 is so designed that there exists a loss of about −1 dB between the office line (PSTN) interface unit 9 and each of the individual telephone set interface units 15a to 15d.

On the other hand, no loss exists between a subscriber for each of the ISDN lines 3a and 3b and a terminal office. Further, the conventional ISDN interface units 5a and 5b perform only signal representation transformation between ternary codes and binary codes, speed conversion between 64 Kb and 2,048 Mb, multiplexing, separation, etc. in general, without performing conversion with respect to the speech PCM codes.

As a result, when one of the extension telephone sets 11a to 11d is connected to an outside line telephone set such as an analog telephone set 23, there arises the following problem: Since both the ISDN and PSTN lines are connected to the key service unit 1, although telephone conversation can be made through any one of the two lines, there exists a difference in speech (transmission) level between the two lines, because the loss through the PSTN line 7 is different from that through the ISDN lines 3a and 3b, as already explained. In other words, the speech level differs according to the used network, when conversation is made with the same person. The similar difference in the speech level occurs between when any one of the extension telephone sets 11a to 11d is connected to a digital telephone set 21 and when any one of the extension telephone sets 11a to 11d is connected to an analog telephone set 23. In addition, the difference in speech level changes being subjected to the influence of installation conditions of the lines 3a, 3b and 7 and the key service unit 1.

As described above, in a telephone system connected to both the analog and digital communication networks such as ISDN and PSTN, there exists a problem in that the speech (transmission) level differs according to the connected network and further the level difference varies according to the device installation conditions, thus resulting in a difficulty in maintaining an appropriate speech level all the time.

SUMMARY OF THE INVENTION

With these problems in mind, therefore, it is the object of the present invention to provide a telephone system which can automatically regulate the speech level, irrespective of the connected networks.

To achieve the above-mentioned object, the present invention provides a telephone system connectable to both a digital communication network and an analog communication network and having a plurality of extension telephone sets, comprising: tone generating means for generating a level confirmation tone; switching means for establishing any given speech pass between the digital and analog communication networks, the plural extension telephone sets and the tone generating means; switching controlling means for controlling the switching means so that a first speech path through which the level confirmation tone from the tone generating means can be transmitted to a first extension telephone set via only the digital communication network and a second speech path through which the level confirmation tone can be transmitted to a second extension telephone set via both the digital and analog communication networks in series can be both established; speech level adjusting means for adjusting level of digital speech signals transmitted via the digital communication network on the basis of a selected gain; and gain controlling means for controlling the selected gain in the speech level adjusting means.

Further, the present invention provides a method of adjusting speech level at the same level in both a digital communication network and an analog communication network, in a telephone system connectable to both the digital and analog communication networks and having a plurality of extension telephone sets, comprising the steps of: generating a level confirmation tone; establishing both a first speech path through which the generated level confirmation tone can be transmitted to a first extension telephone set via only the digital communication network and a second speech path through which the generated level confirmation tone can be transmitted to a second extension telephone set via both the digital and analog communication networks in series; comparing a level of the generated level confirmation tone transmitted to the first extension telephone set through the first speech path with that transmitted to the second extension telephone set through the second speech path; adjusting the level of digital speech signals transmitted via the digital communication network on the basis of a selected gain; and determining the selected gain so that the level of the level confirmation tone transmitted to the first extension telephone set matches that to the second extension telephone set.

DESCRIPTION OF THE PREFERRED EMBODIMENT

A preferred embodiment of the present invention will be explained hereinbelow with reference to the attached drawings. The embodiment described below is a key telephone system whose basic system configuration is the same as shown in FIG. 1. In more detail with reference to FIG. 1, a key service unit 1 comprises an ISDN interface units 5a and 5b connected to ISDN lines 3a and 3b, a PSTN interface unit 9 connected to a PSTN line 7, and standard telephone device interface units 15a to 15d connected to an extension telephone set (e.g. a standard telephone set) 11. These interface units are connected to a central control unit 20 for controlling various calling and switching processing via a data highway 17 and a speech highway 19.

Figure 2:
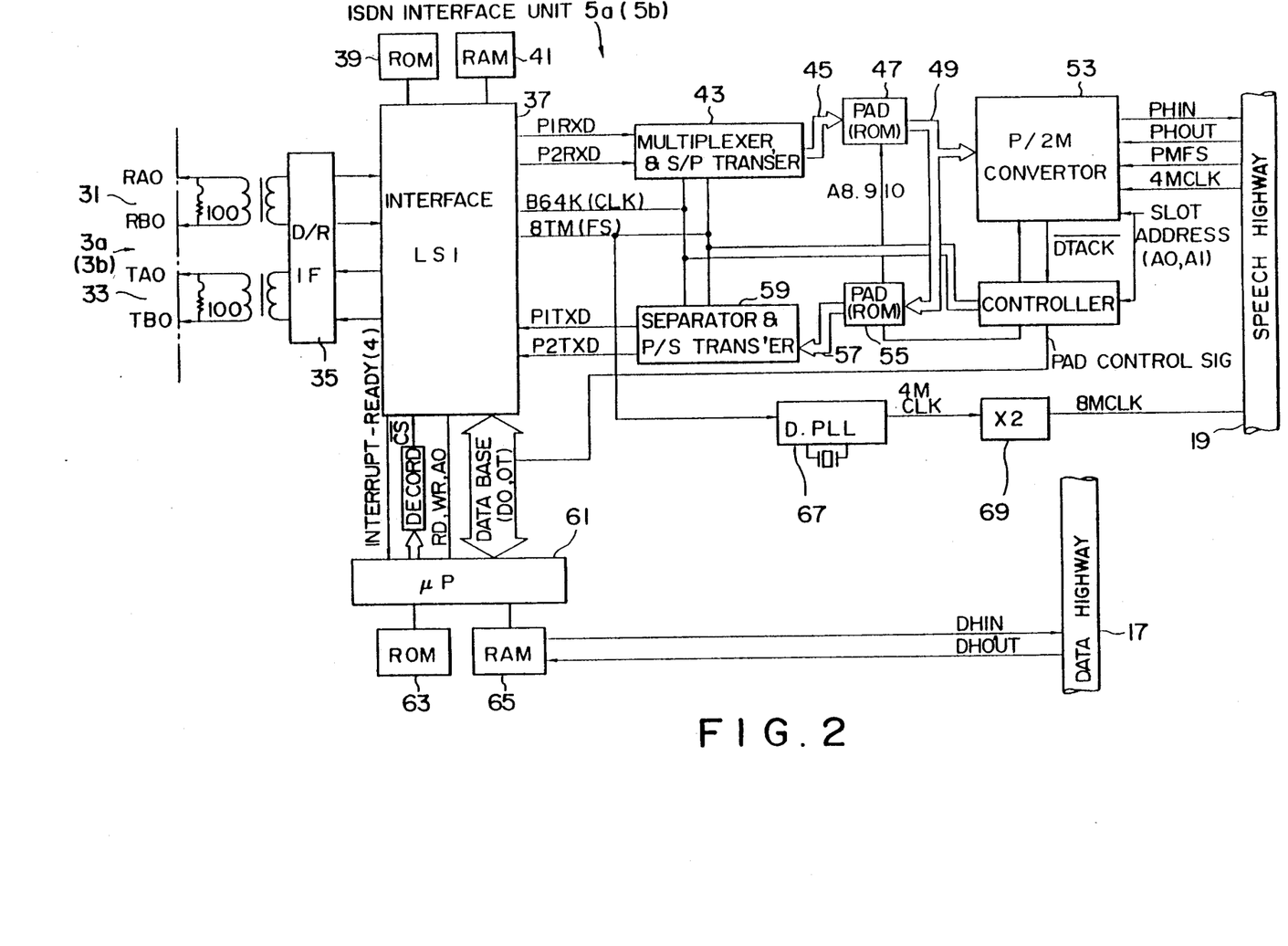
FIG. 2 is a block diagram showing an ISDN interface unit used for an embodiment of the key telephone system according to the present invention.

FIG. 2 shows a configuration of the ISDN interface unit 5a of the present embodiment. Further, the other ISDN interface unit 5b is configured in quite the same way. In FIG. 2, 2-channel speech data and 1-channel control data fed through a receive interface line 31 of the ISDN line 3a are converted from ternary signal to binary signal, and then applied to an interface LSI 37. In this LSI 37, processing related to two different layers (e.g. separation of speech data (layer 1) from control data (layer 2)) in accordance with programs or other information for controlling the operation of the interface LSI 37, which are stored in a ROM 39 and a RAM 41. The separated speed data are inputted to a multiplexing and serial/parallel transforming section 43 via a first port receive data line P1RXD and a second port receive data line P2RXD. In the multiplexing and series/parallel transforming section 43, 2-channel speech data transmitted in serial mode at 64 Kbps are multiplexed into 128 Kbps, transformed into parallel mode, and then fed to a bus 45. These parallel speech data (8-bit PCM codes) are inputted to a ROM (i.e. receive digital pad) 47, and 8-bit PCM codes stored at an address area corresponding to the speech data are read out of the receive digital pad (PAD) 47 and then fed to a bus 49.

Figure 3:
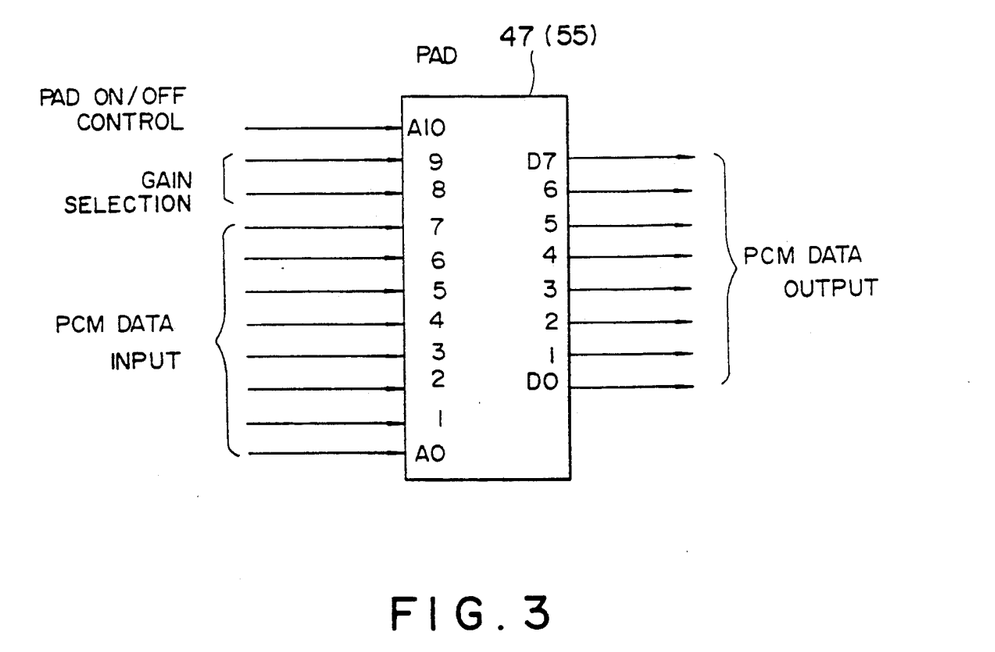
FIG. 3 is a diagram for assistance in explaining the relationship between input and output signals of a transmit/receive digital pad provided in the interface unit shown in FIG. 1.

As shown in FIG. 3, this receive digital pad 47 is constructed in such a way as to receive speech data represented by 8 lower significant address bits A0 to A7, a signal for selecting a gain represented by two middle significant bits A8 and A9; and a signal for controlling the on-off operation of this pad represented by the most significant bit 10A. Further, the gain selecting signal based on the bits A8 and A9 and the on/off control signal based on the bit 10A are given from a controller 51.

Figure 4A:
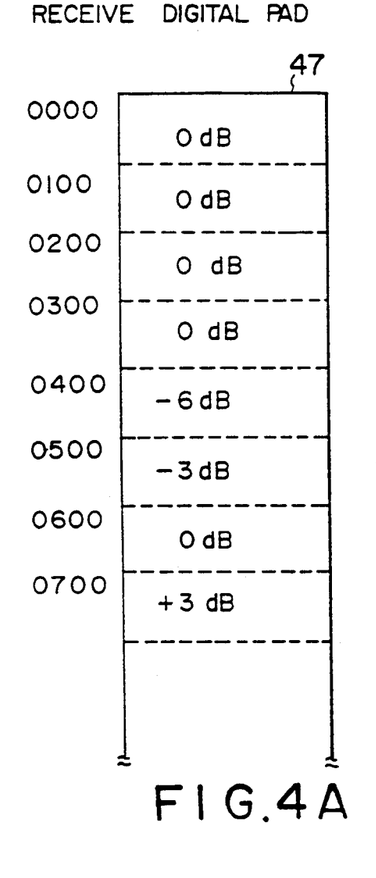
FIGS. 4(A) and 4(B) are diagrams for assistance in explaining a plurality of subpads provided in the transmit and receive digital pads, respectively.

As shown in FIG. 4, this pad 47 is provided with 8 subpads 0000 to 0700, and each subpad includes 256 address areas each of which can be selected in response to a speech data represented by bits A0 to A7. The first to fourth subpads from 0000 to 0300 are selected to produce a gain of 0 dB (i.e. no gain) when the logical value of the on/off control signal represented by a bit A10 is "0" (off). That is, 8-bit codes the same as the speech data represented by bits A0 to A7 are stored at the address areas of the subpads, respectively. The fifth to eighth subpads from 0400 to 0700 are selected to produce one of four different gains of $-6$, $-3$, 0, and $+3$ dB according to the logical value of the gain selecting signal represented by bits A8 and A9 when the logical value of the on/off control signal A10 is "1" (on). That is, 8-bit codes obtained by adding each gain to the speech data represented by bits A0 to A7 are stored at the address areas in the subpads, respectively.

Figure 4B:
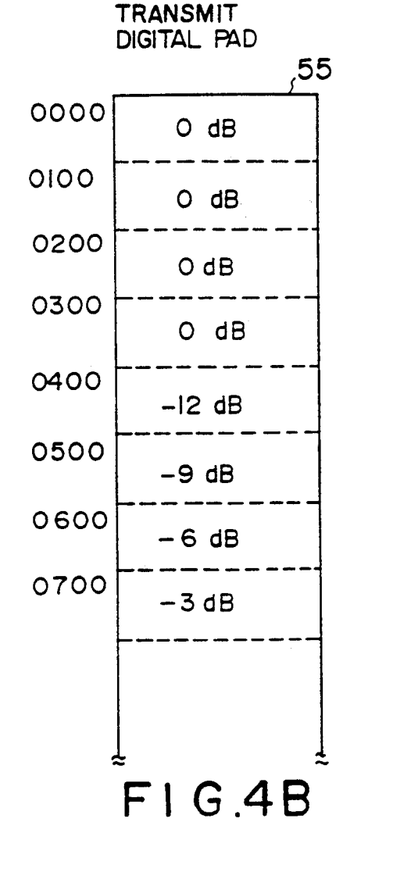

With reference to FIG. 2 again, the speech data to which a selected gain is added and read out of the receive digital pad 47 are inputted to a conversion section 53 to convert the parallel data to 2 Mbps serial data, and then superposed upon a designated time slot of an up-line of the speech high way 19. In addition, the conversion section 53 reads speech data from a designated time slot of a down-line of the speech high way 19. The read speech data are converted into parallel data and then sent out to a bus 49. The parallel speech data are inputted to a transmit digital pad 55. This transmit digital pad 55 is a ROM similar to the receive digital pad 47, and receives speech data represented by 8 lower significant address bits A0 to A7, a gain selecting signal represented by two middle significant bits A8 and A9 and an on/off control signal represented by the most significant bit 10A as shown in FIG. 3. Further, as shown in FIG. 4B the transmit digital pad 55 can select any one of gains of 0 (off), $-12$, $-9$, $-6$ and $-3$ dB.

Speech data read out of the transmit digital pad 55 are inputted to a parallel/serial converting and separating section 59 via a bus 57. The parallel/serial converting and separating section 59 converts 2-channel speech data inputted in parallel at 128 Kbps speed, respectively into serial data, separates these data according to the channels, and sends the data to a first port transmit data line P1TXD and a second port transmit data line P2TXD. These speech data are further inputted to the interface LSI 37, multiplexed with control data, converted into ternary signals by a driver/receiver 35, and then fed to a transmit interface line 33 of the ISDN line 3a.

On the other hand, control data (selection signals, process identifiers, etc.) inputted to the interface LSI 37 via the ISDN line 3a are isolated from speech data, inputted to a communication repeating microprocessor 61, and then transmitted to a central control unit 20 via a data highway 17. Further, programs and other information for controlling the operation of the microprocessor 61 are stored in a ROM 63 and a RAM 65.

The control data given from the central control unit 20 to the ISDN interface unit 5a are inputted to the microprocessor 61 via the data highway 17. Some data among control data inputted to the microprocessor 61 are applied to the interface LSI 37 so as to be multiplexed with speech data before sending out to the transmit interface line 33 via the driver/receiver 35. Further, as described later, control data given from the central control unit 20 include data for controlling the receive digital pad 47 and the transmit digital pad 55. In response to the pad control data, the microprocessor 61 outputs pad control signals to the controller 51. The controller 51 sets three higher significant address bits A8, A9 and A10 applied to the receive and transmit digital pads 47 and 55 to values designated by the pad control signals, so that one subpad of each of the digital pads 47 and 55 is selected and enabled. Further, a digital PLL (phase locked loop) circuit 67 and a frequency multiplier 69 are incorporated to synchronize a clock frequency of the speech highway 19 with that of the ISDN line 3.

Figure 5:
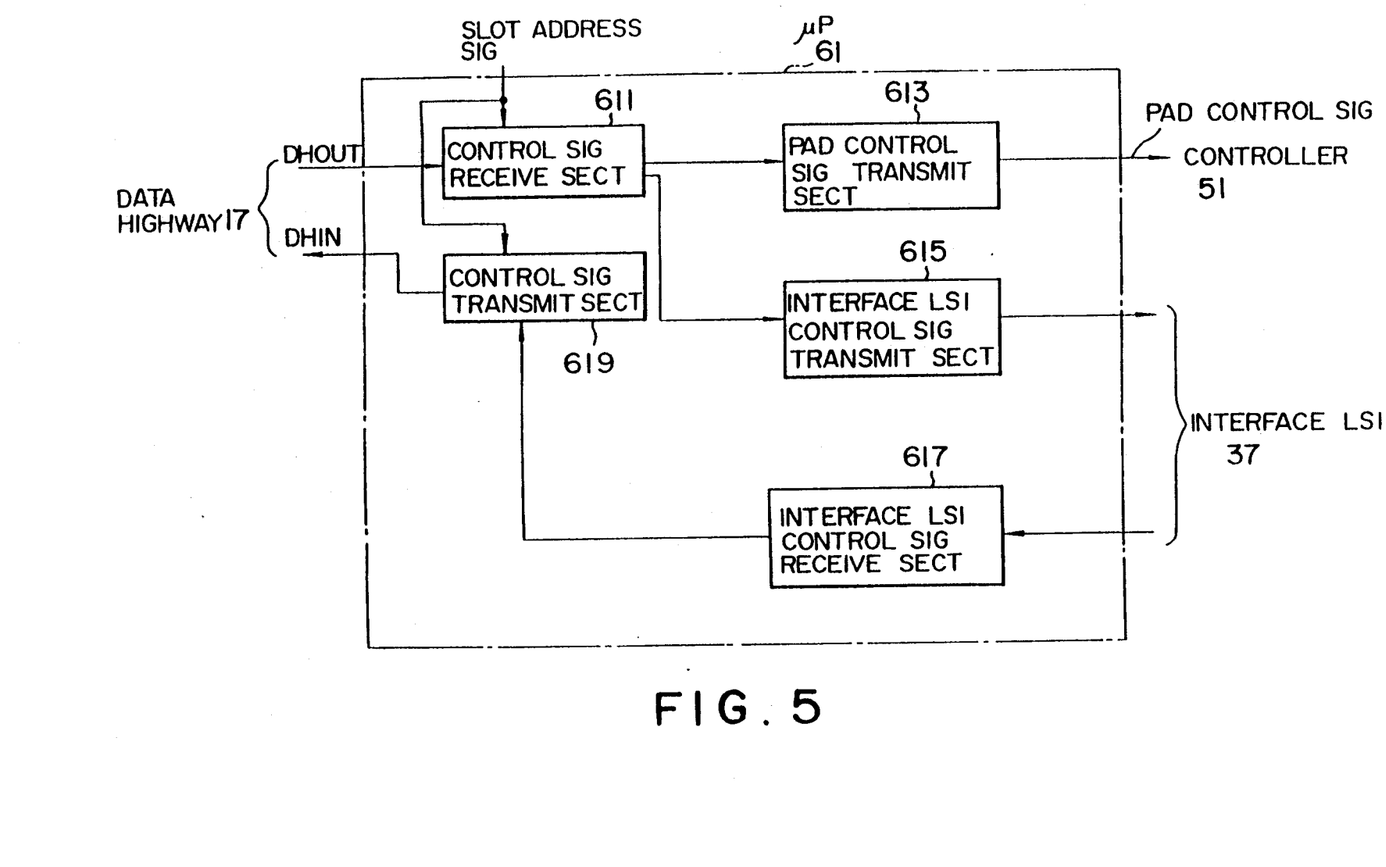
FIG. 5 is a block diagram showing a microprocessor provided in the interface unit shown in FIG. 2.

FIG. 5 shows a configuration of the microprocessor 61 within the ISDN interface unit 5. In the drawing, a control signal receive section 611 has access to a specific time slot designated by a slot address signal on a down-highway DHOUT of the data highway 17 to receive control data supplied from the central control unit 20, and separates pad control data from other control data. The separated pad control data are sent to a pad control signal transmit section 613, from which the pad control signals are transmitted to the controller 51. The other control data are transmitted to the interface LSI 37 via an interface LSI control signal transmit section 615.

An interface LSI control signal receive section 617 receives control data from the interface LSI 37, and sends the received control data to a control signal transmit section 619. The control signal transmit section 619 has access to a specific time slot designated by a slot address signal on an up-highway DHIN of the data highway 17 to transmit control data from the interface LSI 37 to this time slot. The transmitted control data are sent to the central control unit 20.

Figure 6:
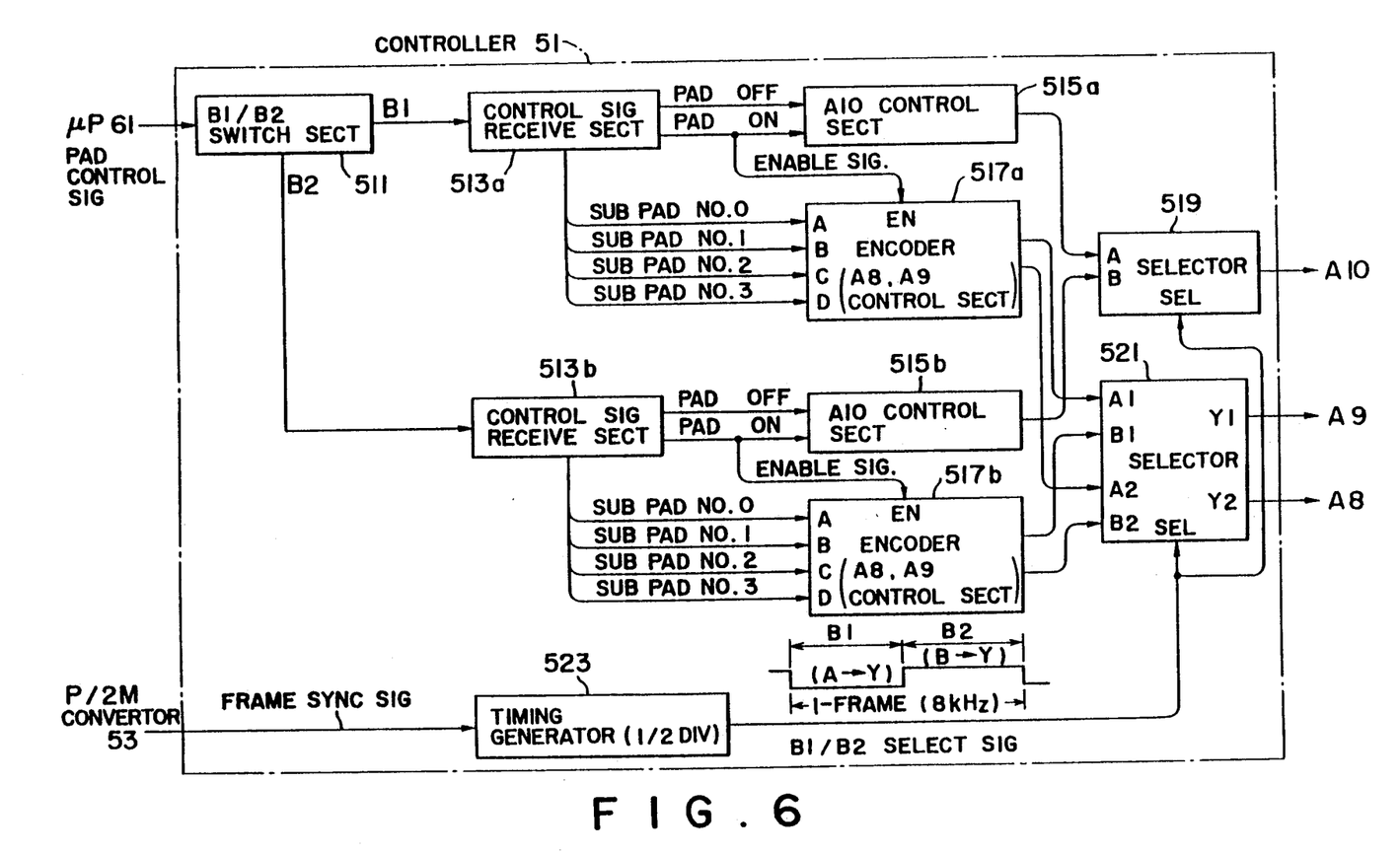
FIG. 6 is a block diagram showing a control circuit provided within the interface unit shown in FIG. 2.

FIG. 6 shows a configuration of a pad control related section of the controller 51 within the ISDN interface unit 5. In the drawing, the pad control signals from the microprocessor 61 are inputted to a B1/B2 switching section 511. This switching section 511 discriminates whether the pad control signal is related to pad control of B1 channel or B2 channel, and transmits pad control signals related to the B1 channel to a control signal receive section 513a and those related to the B2 channel to another control signal receive section 513b, respectively.

The control signal receive section 513a for receiving the B1-channel related pad control signal obtains pad on/off-related information from the control signals, and further recognizes a selected subpad number when "on" is obtained. The pad on/off information is fed to an A10 controller 515a. The A10 controller 515a forms a B1 channel related on/off control signal and outputs the formed control signal to one input terminal A of a selector 519. When B1 channel related pads are turned on, further a selected subpad number is inputted to an encoder 517a. The encoder 517a forms a 2-bit data representative of an inputted subpad number, and outputs this data to two input terminals A1 and A2 of a selector 521.

With respect to the B2 channel, the same processing as described above are implemented by a control signal receive section 513b, an A10 controller 515b and an encoder 517b. As a result, B2-channel related on/off control signal is applied to the other input terminal B of the selector 519. When B2 channel related pads are turned on, further a 2-bit data representative of a selected subpad number are applied to two input terminals B1 and B2 of the selector 521.

The selector 519 outputs an on/off control signal selected from one of two input terminals A and B. The outputted on/off control signal is applied to the most significant address bit A10 of both the receive and transmit digital pads 47 and 55. The selector 521 outputs a subpad number data selected from one pair of the input terminals A1, A2 and B1 and B2. The outputted subpad number data are added to the succeeding address bits A9 and A8.

A timing signal generating section 523 divides a frame synchronizing signal into ½ to form a B1/B2 switching signal as shown in FIG. 6. The formed switching signal is applied to the selector terminals SEL of the two selectors 519 and 521, respectively. As a result, an on/off control signal and a subpad number data related to the B1 channel are selected during a first half of each frame, and an on/off control signal and a subpad number data related to the B2 channel are selected during a second half of each frame. These selected signals and data are applied to address bits A10, A9 and A8 of the receive and transmit digital pads 47 and 55, in order to determine each gain related to the B1 or B2 channel.

Figure 7:
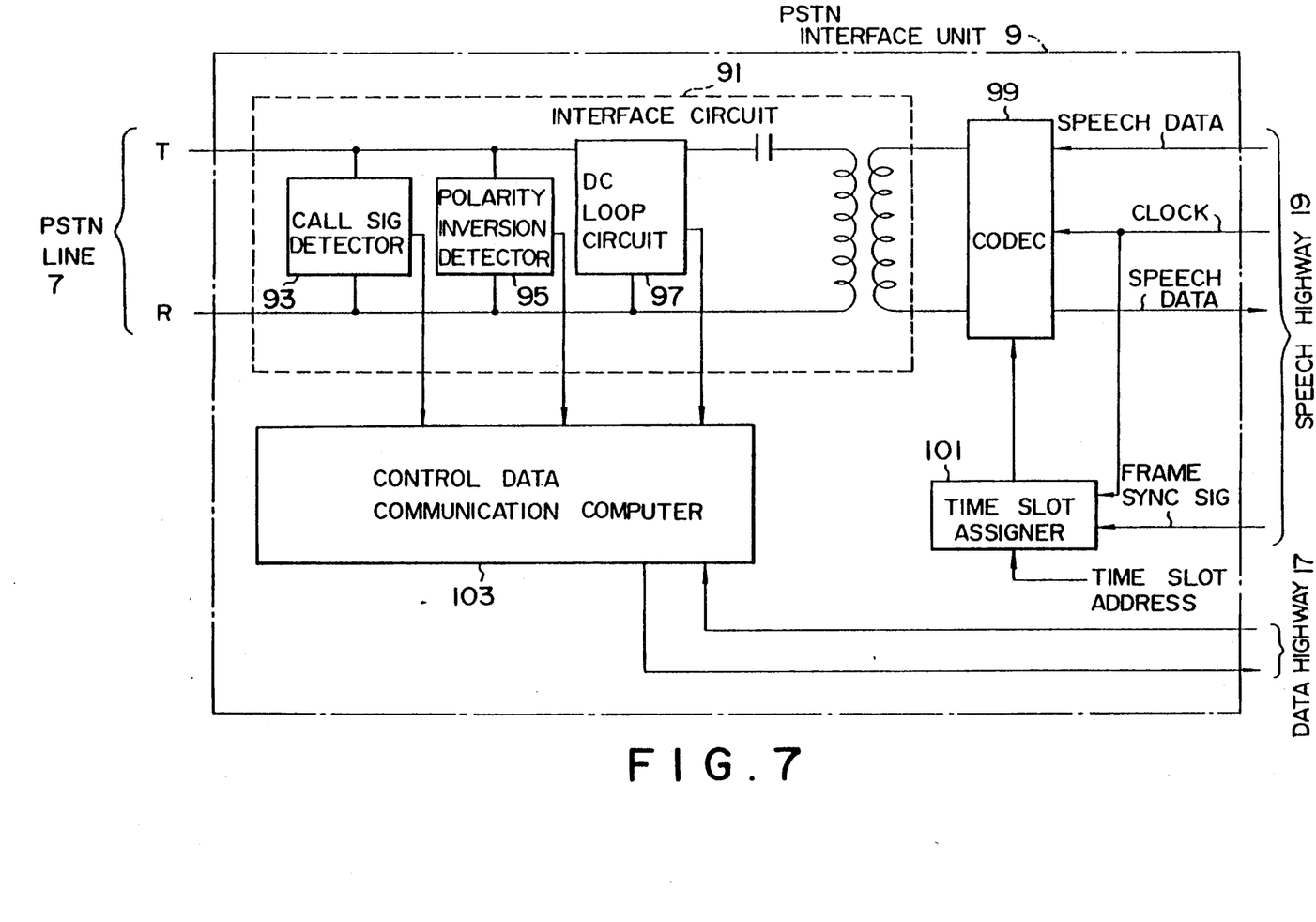
FIG. 7 is a block diagram showing a PSTN interface unit used for the afore-mentioned embodiment.

FIG. 7 shows a configuration of the PSTN interface unit 9. An interface circuit 91 including a call signal detector 93, a polarity inversion detector 95 and a dc loop circuit 97 is connected to the PSTN line 7, in order to detect a call signal from the line 7, the polarity inversion of the line 7 and the close/open of a dc loop, and further to send dial pulses to the line 7. A codec 99 converts speech signals from analog to digital or vice versa, which is connected in AC manner to the line 7 when a dc loop is closed by the DC loop circuit 97.

A time slot assigner 101 decides a timing at which the codec 99 receives or transmits speech data through the speech highway 19 on the basis of a time slot address previously determined for the codec 99, a frame synchronizing signal from the speech highway 19 and a clock, and applies a determined timing signal to the codec 99. The codec 99 receives or transmits speech data through the speech highway 19 within a time period assigned by the time slot assigner 101.

A control data communication microcomputer 103 monitors detection signals from the call signal detector 93 and the polarity inversion detector 95, controls the DC loop circuit 97, and receives and transmits various control data related to the call signal detection with respect to the central control unit 20, the polarity inversion detection, dc loop opening/closing, and the dial pulse transmission, etc. through the data highway 17.

Figure 8:
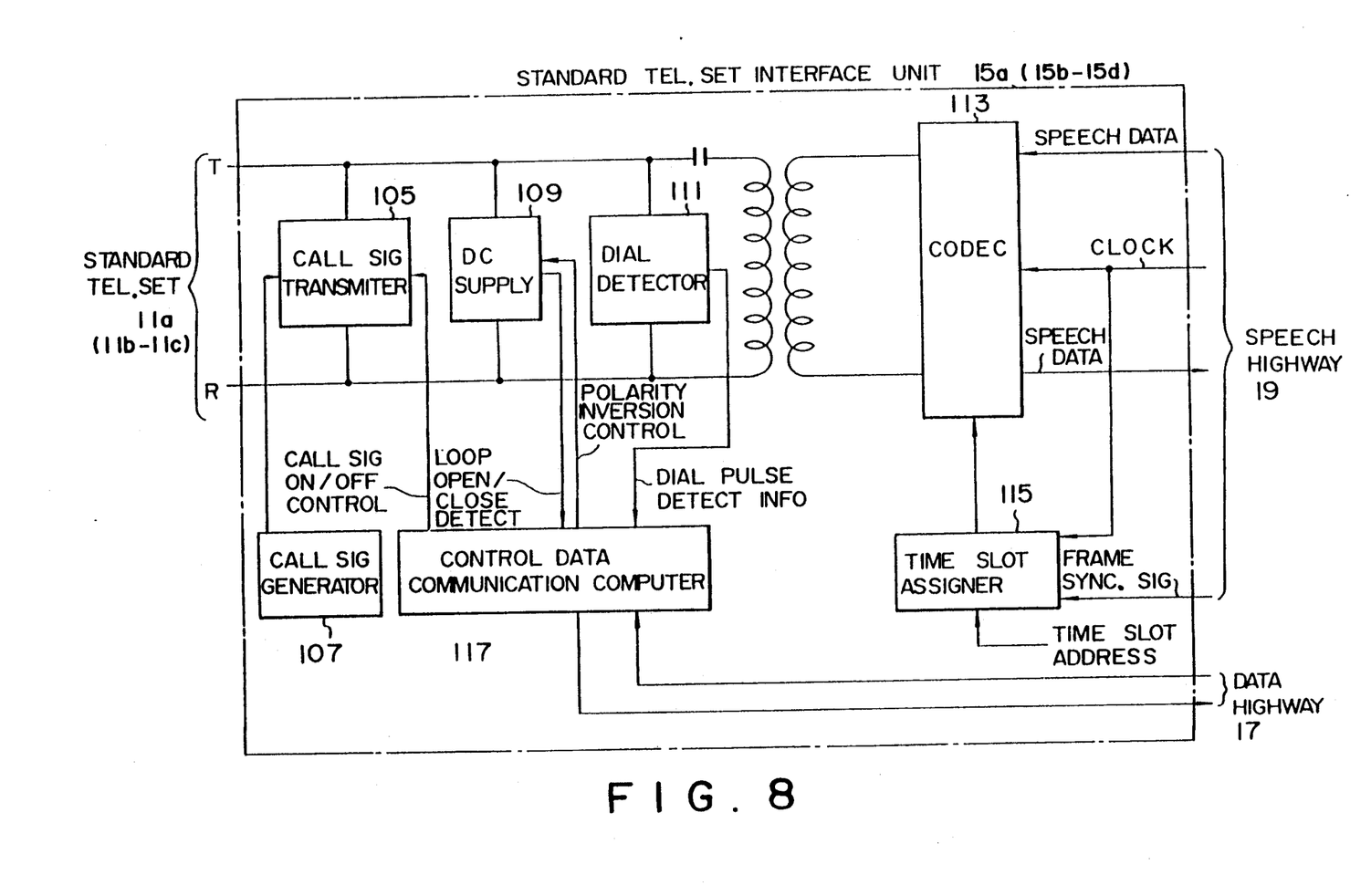
FIG. 8 is a block diagram showing a standard telephone set interface unit of the above embodiment.

FIG. 8 shows a configuration of a standard telephone set interface unit 15a. The other standard telephone set interface units 15b-15d also have the same configuration. A call signal transmitter 105 transmits a call signal (e.g. 16 Hz ac signal) supplied from a call signal generator 107 to a standard telephone set 11a. A dc voltage supply circuit 109 supplies a prescribed dc voltage to the standard telephone set 11a to invert the polarity thereof, and detects the dc-loop opening/closing by the standard telephone set 11a. A dial detector 111 detects a dial pulse of the telephone set 11.

A codec 113 converts speech signals from analog to digital or vice versa and receives and transmits speech data through the speech highway 19 within a time period assigned by the time slot assigner 115.

A control data communication microcomputer 117 controls the call signal transmit/interrupt (on/off), monitors the dc loop opening/closing, controls the polarity inversion, monitors the dial pulse detection result, and communicates control data with the central control unit 20 through the data highway 17.

Figure 9:
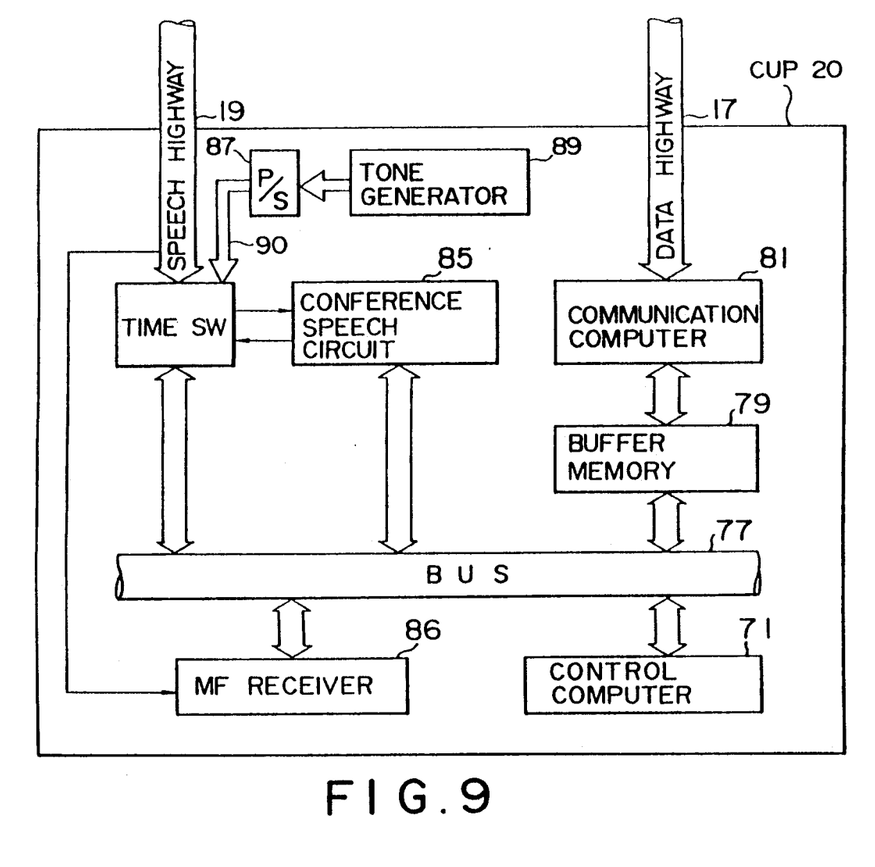
FIG. 9 is a block diagram showing a central control unit of the above embodiment.

FIG. 9 shows a configuration of the central control unit 20 of this embodiment. The central control unit 20 includes a control microcomputer 71 connected to the data highway 17 via a buffer memory 79 and a communication microcomputer 81. The control microcomputer 71 controls the operations of the ISDN interface units 5a and 5b, the PSTN interface unit 7 and the standard telephone set interface units 15a to 15d by transmitting/receiving control data to/from these interface units through the data highway 17. This control microcomputer 71 also controls a time switch 83, a conference speech circuit 85, etc. The time switch 83 is connected to the speech highway 19 to switch speech channels. The conference speech circuit 85 is connected to the time switch 83 to process speech data during conference conversation.

An MF signal receiver 86 receives digit signals outputted from the standard telephone sets 11a to 11d in the form of multifrequency code (MF signals) through the speech highway 19. In the ordinary standard telephone sets 11a to 11d, it is possible to select any one of MF mode in which digit signals are outputted in the form of MF signals and DP mode in which digit signals are outputted in the form of dial pulses. In this embodiment, however, an assumption is made that the MF mode is selected. Therefore, all digit signals from each of the standard telephone sets 11a to 11d are received by the MF signal receiver 86. The MF signal receiver 86 converts the received digit signals into predetermined digital codes to transmit these to the control microcomputer 71.

A tone generator 89 includes a ROM in which tone data (PCM codes) sampled at a frequency of 8 kHz are previously stored to generate various tones such as extension dial tone, beep tone, etc. used for the key telephone system. These tone data are always read out of the tone generator 89. A speech level confirmation tone is stored in this tone generator 89 as one of these tone data. This speech level confirmation tone is used as a reference speech signal when the speech level of the ISDN lines 3a and 3b is adjusted according to the present invention, in such a way that the speech level at when only the ISDN lines 3a and 3b are used becomes equal to that at when the PSTN line 7 is used. As this speech level confirmation tone, a speech signal including only a single frequency can be used. However, it is also possible to use a speech signal including various uniform frequency components within a speech frequency band under consideration of line frequency characteristics. Various tone data generated by the tone generator 89 (i.e. dial tone, beep tone, speech level confirmation tone, etc.) are inputted to the parallel/serial (P/S) converter 87 in the form of parallel signals. The inputted parallel signals are converted into 8-bit serial signal through the P/S converter 87, and then transmitted to the time switch 83 via an up tone data highway 90. Each of these various tones can be transmitted to any given time slots in the speech highway 19 by the function of the time switch 83.

Figure 10:
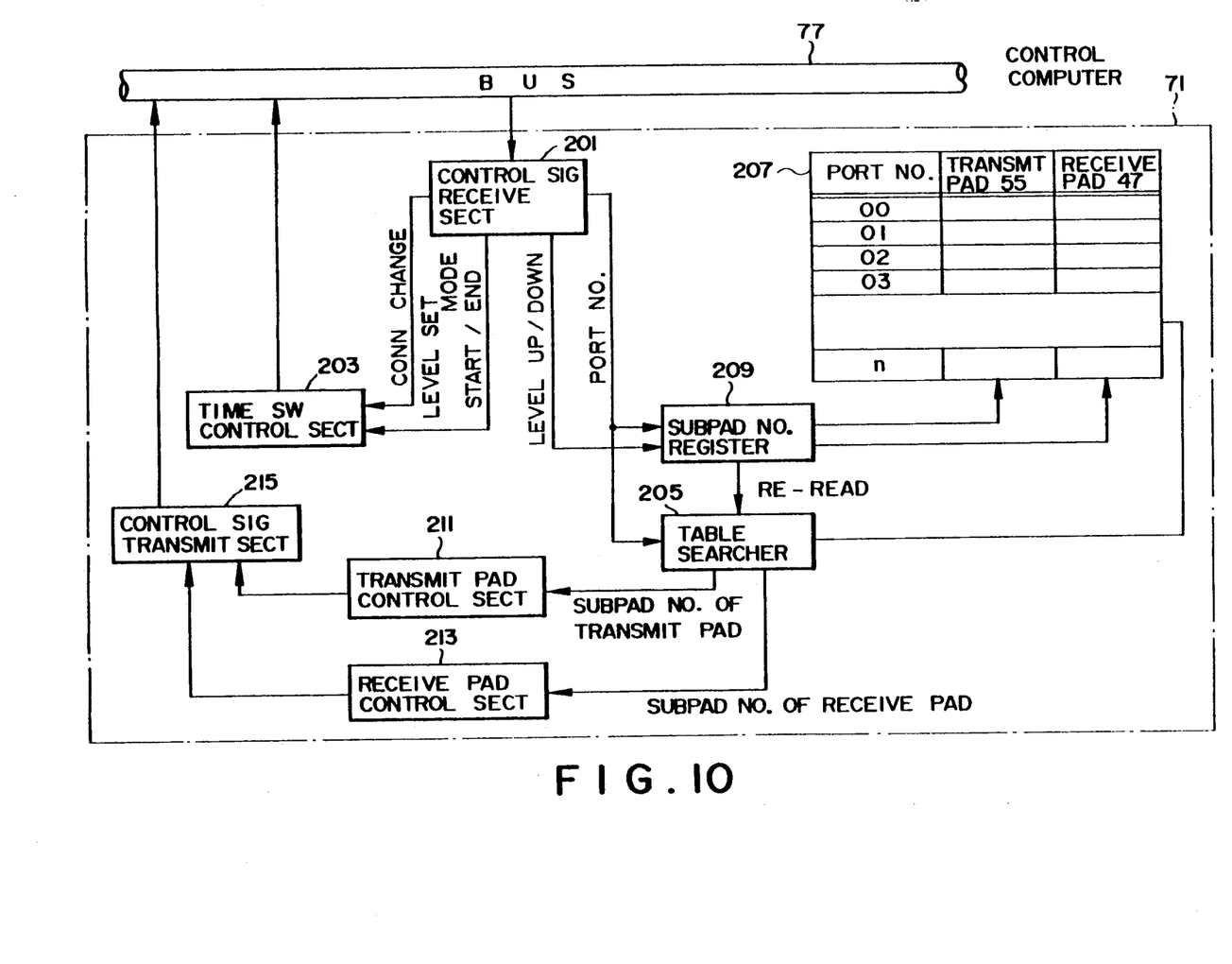
FIG. 10 is a block diagram showing a microcomputer incorporated in the central control unit shown in FIG. 9.
Figure 11A:
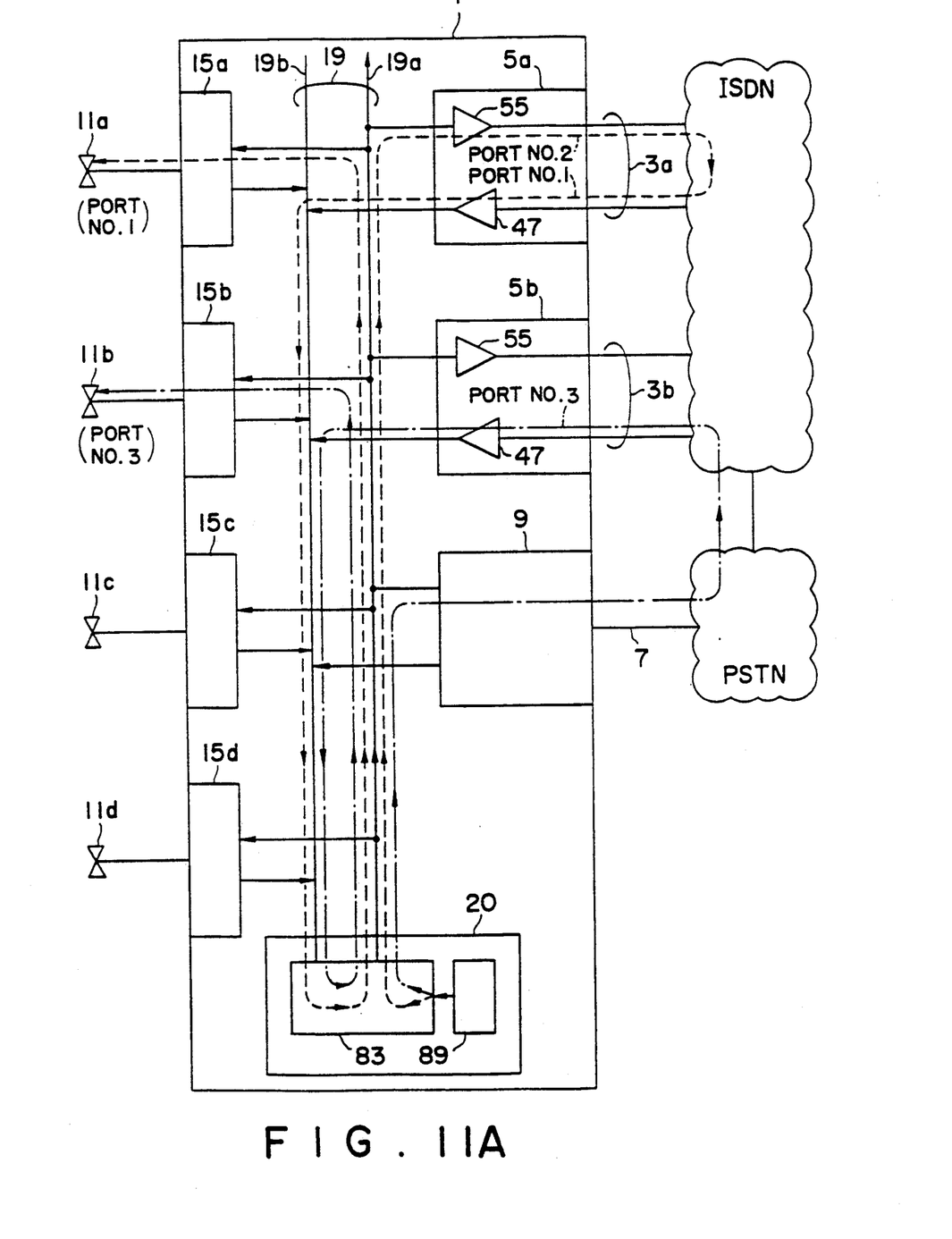
FIGS. 11A and 11B are diagrams for assistance in explaining the routes through which level confirmation tones flow when the tone level is regulated in accordance with the present invention.
Figure 11B:
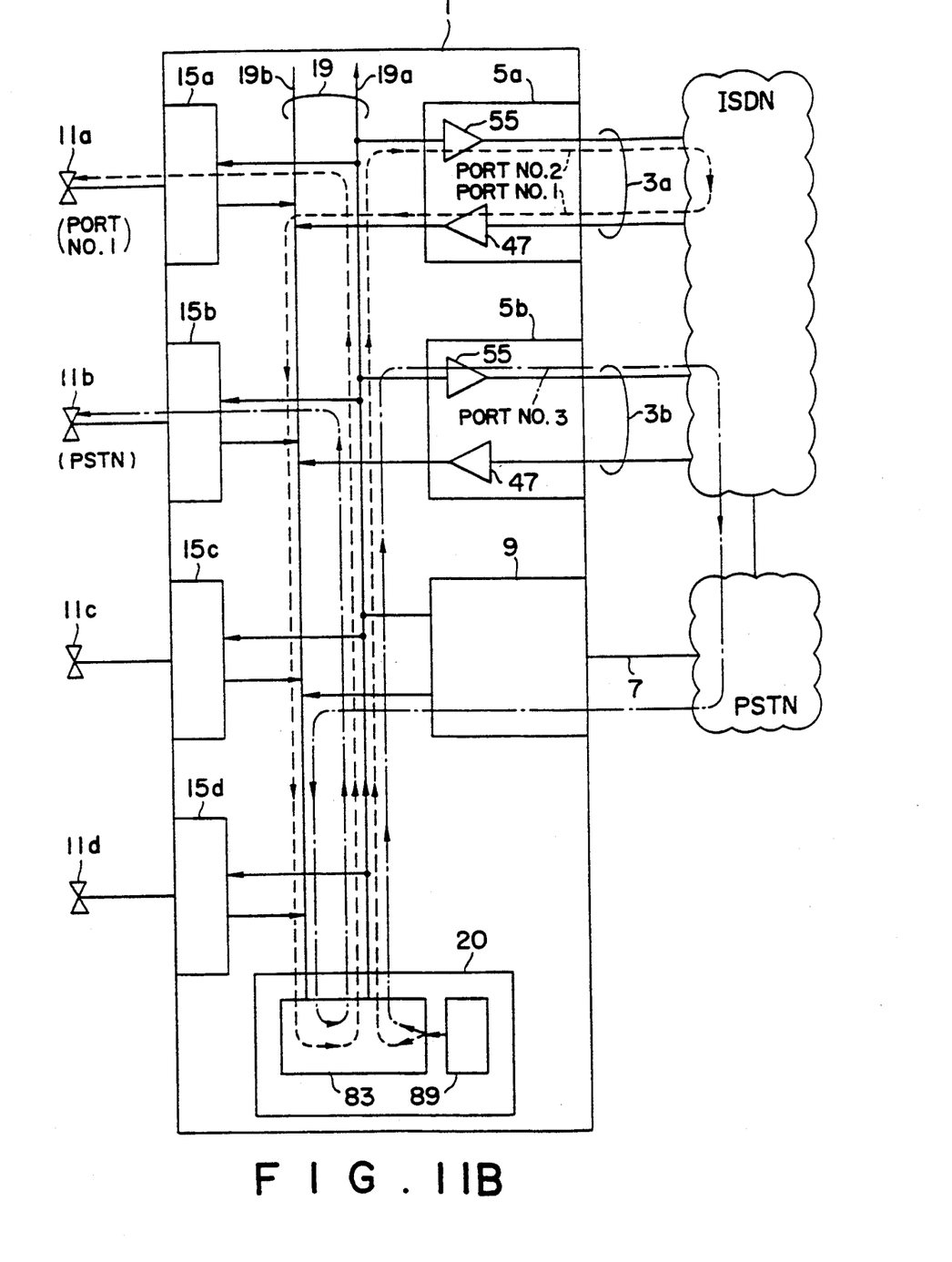

FIG. 10 shows a partial configuration of the control microcomputer 1, in which only the configuration related to the speech level adjusting operation according to the present invention is depicted. Further, FIGS. 11A and 11B show routes through which the level confirmation tone flows when the speech level is adjusted in accordance with the present invention. The operation of the speech level adjustment will be described hereinbelow with reference to these drawings.

With reference to FIG. 11A, each of the ISDN lines 3a and 3b includes two ports, respectively as already explained. Therefore, the two ports of one ISDN line 3a are referred to as port 1 and port 2, and those of the other ISDN line 3b are referred to as port 3 and port 4, hereinafter for discrimination. In the speech level adjusting operation, first the operator transmits a call signal from an extension telephone set 1 to the ISDN through the port 1 of the ISDN line 3a. The transmitted call signal is returned by the ISDN and given to the port 2 of the ISDN line 3a to call another extension telephone set 11c.

After having responded to the incoming call by taking up a handset of the telephone set 11c, the called operator enters a predetermined specific number representative of "level adjustment mode start" through the dial keys of this telephone set 11c. The entered specific number is transmitted to the control microcomputer 71 as a control signal via the data highway 17 and bus 77.

With reference to FIG. 10, in the control microcomputer 71, the control signal receive section 201 receives the specific number, and indicates a level adjustment mode start to the time switch control section 203. Then, the time switch control section 203 controls the time switch 83 in such a way that the speech path between the telephone set 11c and the port 2 of the ISDN line 3a is disconnected but the speech path between the tone generator 89 for outputting the level confirmation tone and the port 2 of the ISDN line 3a can be connected. Therefore, as shown by dashed line in FIG. 11A, the level confirmation tone is transmitted to the telephone set 11a via a route passing only the ISDN line 3a, so that the operator can hear the tone through the handset.

Then, the operator transmits a call signal from another telephone set 11b to the ISDN through the port 3 of the ISDN line 3b. The transmitted call signal is returned by the PSTN and given to the PSTN line 7 to call the telephone set 11d. After having responded to the incoming call by taking up a handset of the telephone set 11d, the called operator enters a predetermined specific number representative of "level adjustment mode start" through the dial keys to transmit the specific number to the control microcomputer 71 as a control signal.

With reference to FIG. 10, in the control microcomputer 71, the control signal receive section 201 receives the above specific number, and indicates it to the time switch control section 203. The time switch control section 203 controls the time switch 83 in such a way that the speech path between the telephone set 11d and the PSTN line 7 is disconnected but the speech path between the tone generator 89 for outputting the level confirmation tone and the PSTN line 7 is connected. Therefore, as shown by dot-dashed line in FIG. 11A, the level confirmation tone is transmitted to the telephone set 11b via a route passing both the PSTN line 7 and the ISDN line 3b in series, so that the operator can hear the tone through the handset.

Here, the operator compares the sound volume of the level confirmation tone heard from the telephone set 11a with that heard from the telephone set 11b, and enters a predetermined number through the telephone set 11a for "level up/down" operation. This specific number is transmitted to the control microcomputer 71 as a control signal.

With reference to FIG. 10, in the control computer 71, the control signal receive section 201 receives the specific number for "level up/down" operation, and indicates it to the subpad number register 209. The subpad number register 209 changes the subpad numbers recorded in the subpad number table 207 in accordance with the indicated specific number. As shown, the pad number table 207 is formed with columns where the subpad numbers of selected subpads of the transmit pad 55 and the receive pad 47 can be recorded for each port number of the ISDN. Among the subpad numbers recorded in the table 207, only the subpad numbers of the transmit pad 55 are changed for all the ports. Upon the completion of the number change, the subpad number register 209 commands the table searcher 205 to read the subpad numbers again. Therefore, the table searcher 205 reads the new subpad numbers of the transmit pad now changed for all the ports from the table 207, and indicates them to the transmit pad control section 211. The transmit pad control section 211 transmits the new indicated subpad numbers to the bus 77 as control signals via the control signal transmit section 215. The new subpad numbers are transmitted to the ISDN interface units 5a and 5b via the data highway. In each ISDN interface unit 5a or 5b, the controller 51 shown in FIG. 6 selects a subpad of the transmit pad 55 corresponding to the new subpad number, so that the sound volume of the telephone set 11a changes according to the loss rate (i.e. gain) of the selected subpad. The operator repeats "level up/down" operation until the sound volume is equal to each other in both the telephone sets 11a and 11b.

When the sound volume matches with each other in both the telephone sets 11a and 11b, the level adjustment for the transmit pad 55 has been completed. Subsequently, the operator enters a predetermined specific number from the telephone set 11a for "connection changing" operation. This specific number is transmitted to the control computer 71 shown in FIG. 10. In the control computer 71, the control signal receive section 201 receives this specific number and indicates it to a time switch control section 203. The time switch control section 203 controls the time switch 83 in such a way that the telephone set 11b and the level confirmation tone are disconnected from the port 3 and the PSTN line 7, respectively, but the telephone set 11b is connected to the PSTN line 7 and further the level confirmation tone is connected to the port 3. Therefore, the level confirmation data is transmitted to the telephone sets 11a and 11b via routes as shown by dashed line and dot-dashed line in FIG. 11B.

The operator again compares the speech level confirmation tones heaved through the telephone sets 11a and 11b with each other, and inputs a specific number through the telephone set 11a for "level up/down" operation. Then, in the same way as already explained, the subpad numbers of the receive pad 47 recorded in the table 207 shown in FIG. 10 are changed for all the ports. The new changed subpad numbers are indicated to the ISDN interface units 5a and 5b. In each ISDN interface unit 5a or 5b, a subpad of the receive subpad 47 corresponding to the new subpad number can be selected. The sound volume of the telephone set 11a changes according to the loss rate (i.e. gain) of the selected subpad. When the sound volume matches with each other in both the telephone sets 11a and 11b, the operator ends the "level up/down" operation, so that the level adjustment for the receive pad 47 is also completed.

Thereafter, the operator inputs a predetermined specific number through the telephone 11a to complete "level adjustment end" operation. This specific number is given to the time switch control section 203 via the control signal receive section 201 of the control computer 71. The time switch control section 203 controls the time switch 83 to open all the above-mentioned speech paths.

In the above description, a method of adjusting the speech level for all the ports at a uniform level has been explained. Without being limited thereto, it is also possible to adjust the speech level separately to each different level for each port unit by inputting a specific number representative of "individual level adjustment" operation through the telephone set during speech as follows:

The assumption is made that a call signal is transmitted from the telephone set 11a to the ISDN via the port 1 or that a call signal is transmitted from the ISDN to the port 1 and the operator responds to the call signal by the telephone set 11a, by way of example. Upon an outgoing call or an incoming call, a control signal indicative of the port number "No. 1" of the port 1 is transmitted to the control computer 7 shown in FIG. 10, and then received by the control signal receive section 201. After that, when a specific number for "individual level adjustment" operation is inputted through the telephone set 11a during speech and additionally another specific number for "level up/down" operation is inputted, the control signal receive section 201 indicates the port number "No. 1" to the subpad number register 209 and the table searcher 205, and additionally the specific number for "level up/down" operation to the subpad number register 209 in response to these specific numbers. The subpad number register 209 changes the subpad numbers of the transmit and receive pads 55 and 47 for only the port No. 1 recorded in the table 207 in accordance with the specific number for "level up/down" operation. After having been changed, the subpad number register 209 commands the table searcher 205 to read it again. Therefore, the table searcher 205 reads the new subpad number changed at the indicated port No. 1 and transmits it to the control signal transmit section 215 via the transmit pad control section 211. The new transmitted subpad number is given to the ISDN interface unit 5a having the port No. 1. In the ISDN interface unit 5a, the controller 51 selects and changes the subpad composed of the transmit and receive pads 55 and 47 at the port number No. 1 in accordance with the new indicated subpad number, thus the speech level adjustment at each port unit can be completed.

Without being limited to the above-mentioned embodiments, the persons skill in the art can consider various modifications, without departing from the spirit and the scope of the gist according to the present invention.

What is claimed is:

1. A telephone system connectable to both a digital communication network and an analog communication network and having a plurality of extension telephone sets, comprising:

tone generating means for generating a level confirmation tone;

switching means for establishing any given speech path between the digital and analog communication networks, the plural extension telephone sets and said tone generating means;

switching controlling means for controlling said switching means so that a first speech path through which the level confirmation tone from said tone generating means can be transmitted to a first extension telephone set via only the digital communication network and a second speech path through which the level confirmation tone can be transmitted to a second extension telephone set via both the digital and analog communication networks in series can be both established;

speech level adjusting means for adjusting level of digital speech signals transmitted via the digital communication network on the basis of a selected gain; and gain controlling means for controlling the selected gain in said speech level adjusting means.

2. A method of adjusting speech level at the same level in both a digital communication network and an analog communication network, in a telephone system connectable to both the digital and analog communication networks and having a plurality of extension telephone sets, comprising the steps of:

generating a level confirmation tone;

establishing both a first speech path through which the generated level confirmation tone can be transmitted to a first extension telephone set via only the digital communication network and a second speech path through which the generated level confirmation tone can be transmitted to a second extension telephone set via both the digital and analog communication networks in series;

comparing a level of the generated level confirmation tone transmitted to the first extension telephone set through the first speech path with that transmitted to the second extension telephone set through the second speech path;

adjusting the level of digital speech signals transmitted via the digital communication network on the basis of a selected gain; and determining the selected gain so that the level of the level confirmation tone transmitted to the first extension telephone set matches that to the second extension telephone set.

* * * * *